United States Patent Office

3,767,741
Patented Oct. 23, 1973

3,767,741
MAKING CARBON FIBERS FROM SOLVENT EXTRACTED AND AIRBLOWN VACUUM DISTILLATION RESIDUES OF PETROLEUM
Mitsuru Toyoguchi, Kanagawa, and Hiroshi Iijima and Kunihiko Moriya, Tokyo, Japan, assignors to Mitsubishi Oil Co., Ltd., Tokyo, Japan
No Drawing. Filed Dec. 10, 1970, Ser. No. 97,023
Claims priority, application Japan, Feb. 20, 1970, 45/14,636
Int. Cl. C01b 31/07
U.S. Cl. 264—29                  20 Claims

ABSTRACT OF THE DISCLOSURE

A process for the production of a carbon fiber, which comprises removing the low molecular weight saturates fraction from the vacuum distillation residue of petroleum by solvent extraction and subjecting the product obtained to an airblowing treatment to obtain a bituminous material having a penetration of from 0 to 2 and a softening point of from 130 to 200° C. and then melt-spinning the bituminous material and carbonizing it, is disclosed.

BACKGROUND OF THE INVENTION

(1) Field of the invention

This invention relates to a process for producing a carbon fiber from the vacuum distillation residue of petroleum (containing the so-called petroleum asphalt). More particularly, this invention relates to a process for producing a carbon fiber characterized by solvent extracting the above-described starting material and subjecting the material obtained to an airblowing treatment at an elevated temperature as a pretreatment in the production of a carbon fiber to improve the spinnability and prevent the sticking of fibers when baking them, thereby improving the characteristics of the final product, such as tensile strength, elasticity, and the like.

(2) Description of the prior art

As a starting material for production of carbon fiber from petroleum asphalt, a hard blown asphalt is generally used. Although it is good in spinnability, there is the difficulty that the fibers obtained stick to each other when baking them.

As one method for removing such difficulty, a pretreating method of hardening the raw material to the extent that the fibers do not stick with each other when baking has been proposed. This method comprises dry-distilling the raw material blown asphalt in an atmosphere of nitrogen at a temperature of 380° C. for 1 hour, and thereafter heating it at a temperature of 300° C. under a reduced pressure of $10^{-4}$ mm. Hg for 3 hours. However, the bituminous material obtained by this method is as high as from 91 to 95% by weight in carbon content $C/(C+H)$, because of thermal polymerization. Such a pre-treating method of the raw material by dry-distillation and heat treatment under reduced pressure is accompanied by difficulties when it is industrialized and the bituminous material obtained tends to deteriorate in spinnability when the carbon content of the material is too high.

Therefore, an object of the present invention is to provide a method for pretreating the vacuum distillation residue of petroleum to obtain the raw material for a carbon fiber which is excellent in spinnability and does not tend to stick when baking by selectively removing the component which tends to cause the sticking of the fibers and is poor in carbonization without causing a high carbon content.

Asphalt is a mixture of complicated components and it can be separated into saturates rich in aliphatic compounds having low molecular weights (about 400 to 800 depending upon the crude oil and the manufacturing process), aromatics having higher molecular weights which are high in aromaticity, resins which are even higher in molecular weight and aromaticity and asphaltenes which have the highest molecular weights and aromaticity by component analysis using solvent separation and chromatographic separation. Of these components, the asphaltenes are said to form micells and disperse colloidally in the other components. The sticking of the fibers in the production of carbon fibers is considered to be caused by the presence of the low molecular weight saturates fraction. This fraction is chemically stable in comparison with other components and is poor in carbonization.

Therefore, if the saturates are selectively removed, the sticking of fibers during the baking stage is prevented and a carbon fiber having an excellent quality is obtained. Also, as the (aromatics plus resins)/asphaltenes ratio increases, the asphaltenes change to a well-peptized state and consequently the spinnability is improved. For this purpose the present inventors have found that the desired result can be obtained by selectively solvent-extracting the saturates from the vacuum distillation residue of the petroleum used as the raw material using a propane deasphalting apparatus and further airblowing the material using an airblowing apparatus.

SUMMARY OF THE INVENTION

The process of the present invention comprises extracting mainly the low molecular weight saturates from the vacuum distillation residue of petroleum using solvent extraction until its penetration ranges from 0 to 10, and then airblowing the material at an elevated temperature rather than firing to modify it to a bituminous material of 0 to 2 in penetration and 130 to 200° C. in softening point, and thereafter melt-spinning the bituminous material and carbonizing it by heat treatment.

DETAILED DESCRIPTION OF THE INVENTION

The vacuum distillation residue of the petroleum used in the present invention commonly has a penetration of from 30 to 700 (as measured at 25° C., 100 g., and 5 seconds according to the method of ASTM D5). The present invention can be carried out using such a residue, for example, as follows: By extracting as much of an oily component rich in saturates as is possible from the residue under the conditions that the volume ratio of propane to the raw material (at 15.6° C.) of from 3:1 to 10:1, at a temperature of from 50 to 85° C. and a pressure of from 20 to 45 kg./cm.$^2$, a bituminous material which has a penetration of from 0 to 10 and a softening point of from 50 to 90° C., and contains less saturates having low molecular weights (about 400 to 800) and is higher in molecular weight and aromaticity can be obtained in a yield of from 50 to 70%. Subsequently, by airblowing the material obtained using an airblowing apparatus in general at a temperature of from 200 to 300° C., a bituminous material which has a penetration of from 0 to 2 and a softening point of from 130 to 200° C. and has less saturates can be prepared. A comparison of the properties of the bituminous material thus obtained and a conventional blown asphalt is shown in the following table:

|  | The bituminous material obtained by the present process | A conventional blown asphalt |
| --- | --- | --- |
| Softening point, °C | 150 | 150 |
| Penetration (at 25° C., 100 g., 5 sec.) | 0 | 3 |
| Component analysis (percent by weight): | | |
| Saturates | 1.0 | 19.3 |
| Aromatics | 30.5 | 22.1 |
| Resins | 17.2 | 7.6 |
| Asphaltenes | 51.3 | 51.0 |
| C/(C + H), (percent by weight) | 89.9 | 89.8 |

The best extracting solvent which can be used in the present invention is propane although other lower hydrocarbons such as butane, propane-butane mixtures, and the like, can be also used. The extraction is preferably carried out to the extent of a saturates content of from 0 to 7% by weight. When the bituminous material obtained by extraction treatment has a penetration of above 10, the bituminous material finally obtained has an excess of saturates. The airblowing time required for obtaining a penetration of from 0 to 2 and a softening point of 130 to 200° C. is generally from 10 to 18 hours, depending upon the type of airblowing apparatus, at an air rate of from 0.5 to 2 m.$^3$/minute per ton of charge. The reaction rate is too low when the temperature is below 200° C. There is a danger of fire hazard in case of the use of temperatures of above 300° C. Therefore, temperatures outside of this range are not preferred on the airblowing process. The most preferred range of temperature is from 260 to 280° C. The amount of saturates in the bituminous material retained using the airblowing step is desired to be as small as possible, preferably below 5% by weight, and more preferably below 1% by weight. When the softening point is below 130° C., a large amount of low molecular weight saturates are contained in the bituminous material and sticking of fibers occurs during the stage of baking them. This is not preferred. Spinning tends to be difficult with a softening point of above 200° C. When the softening point is from 130 to 200° C., the penetration necessarily ranges from 0 to 2. The bituminous material obtained by the process of the present invention has less than 91% by weight carbon C/(C+H).

The present process is economically quite advantageous since, in contrast to the dry distillation of blown asphalt and heat treatment under reduced pressure as described above, the present process can be carried out by the combination of existing apparatus and the extracted oily fraction which is rich in saturates can be used as a base oil for lubricants. Since an excessive thermal polymerization in contrast to dry distillation and heat treatment under reduced pressure does not occurs, the C/C+H is less than 91%, yet is not so different from that of conventional blown asphalt and therefore its spinnability is not decreased.

The spinning of the bituminous material can be carried out by conventional methods, and the optimum conditions are as follows: The bituminous material is heated to melting at an appropriate temperature of from 200 to 300° C. and spun by extrusion spinning through a nozzle or centrifugal spinning using a rotating disc to obtain fibers of from 5 to 20$\mu$ in diameter. Next, the fibers are heated up gradually in an oxidizing atmosphere, for example, in air or in air containing oxygen or ozone from a temperature of from 30 to 80° C. to a temperature of from 200 to 300° C. over a period of from 2 to 10 hours. Thereby the fiber becomes stiff and does not deform even if further heated at a higher temperature. Incidentally, it is occasionally effective to previously spray a solution of an inorganic halide such as iron chloride, copper chloride, aluminum chloride, zinc chloride, and the like as an alcohol or an aqueous solution containing a surface active agent on the surface of fiber. The fiber thus treated is subsequently subjected to carbonizing treatment by elevating the temperature to 1000° C. over from 1 to 6 hours in an inert atmosphere such as nitrogen. A carbon fiber which is sufficiently useful in strength is obtained at a carbonizing temperature of 1000° C., however, if necessary, the fiber can be graphitized by elevating the temperature further for example, to 2000° C.

The present invention will be further illustrated by reference to the following examples:

EXAMPLE 1

The saturates fraction was removed by extracting from the vacuum distillation residue of a petroleum having a penetration of 446 used as a raw material under such conditions of a 6:1 ratio of propane to raw material, of 70 to 85°C. in temperature and of 40 kg./cm.$^2$ in pressure using a propane deasphalting apparatus to obtain a bituminous material having a penetration of 2 and a softening point of 79.7° C. The bituminous material was then subjected to an airblowing treatment at a temperature of 260° C. and an air rate of 0.5 to 1.0 m.$^3$/min. per ton of charge, for about 18 hours using an airblowing apparatus, thereby obtaining a bituminous material having a penetration of 0, a softening point of 155° C. and being 89.8% by weight in C/(C+H). Next, the material was melted at a temperature of 210° C. and extruded through a spinning nozzle to obtain a fiber of from 10 to 15$\mu$ in diameter. This fiber was treated in air containing ozone at a temperature of 50° C. for 3 hours and subsequently heated up to a temperature of 250° C. in air over 4 hours. Thereafter, it was heated up to 1000° C. over 3 hours in a nitrogen atmosphere for carbonization. The carbon fiber thus obtained had a tensile strength of $9.6 \times 10^3$ kg./cm.$^2$.

EXAMPLE 2

The saturates fraction was removed by extracting from straight asphalt having a penetration of 300 used as a raw material under the same conditions as used in Example 1 using a propane deasphalting apparatus to obtain a bituminous material having a penetration of 1 and a softening point of 81.0° C. Then, the bituminous material was subjected to an airblowing treatment at a temperature of 260° C. and an air rate of 0.8 to 1.0 m.$^3$/min. per ton of charge, for about 16 hours to obtain a bituminous material having a penetration of 0, and a softening point of 172.0° C. and being 90.0% by weight in C/(C+H). Next, the material was melted at the temperature of 300° C. and spun using a centrifugal spinning apparatus to obtain a fiber of from 7 to 10$\mu$ in diameter. The fiber was heated in air from a temperature of from 60 to 250° C. over a 7 hour period and, thereafter, was heated to 1000° C. over a 3 hour period in a nitrogen atmosphere for carbonization. The carbon fiber thus obtained had a tensile strength of $10.0 \times 10^3$ kg./cm.$^2$.

What is claimed is:
1. In a process for producing a carbon fiber comprising:
   (1) removing the low molecular weight fraction from the vacuum distillation residue of petroleum to obtain a material having a mean molecular weight higher than the starting material;
   (2) melting the resulting material and extruding the melted material to form a fiber;
   (3) infusibilizing said fiber; and
   (4) carbonizing the resulting infusibilized fiber to form said carbon fiber, the improvement comprising:
   removing an oily component rich in low molecular weight aliphatic saturates from said vacuum distillation residue of petroleum, said vacuum distillation residue of petroleum comprising said low molecular weight aliphatic saturates, aromatics having a higher molecular weight, resins which are even higher in molecular weight than said aromatics, and asphaltenes having the highest molecular weight which are colloidally dispersed in said saturates, aromatics and resins, by subjecting said residue to solvent extraction with a lower hydrocarbon extracting solvent capable of extracting said oily component to obtain an intermediate material having a penetration value of from 0 to 10 and a saturates content of from 0 to 7 weight percent; and
   airblowing the resulting intermediate material at an elevated temperature to convert it into a bituminous material having a penetration value of from 0 to 2, a softening point of from 130 to 200° C., and having a carbon content of less than 91% by weight based on the amount of carbon and hydrogen to obtain a material for said step (2).

2. The process for producing a carbon fiber as set forth in claim 1, wherein the vacuum distillation residue of petroleum has a penetration of from 30 to 700.

3. The process as set forth in claim 1, wherein the molecular weight of the saturates fraction ranges from 400 to 800.

4. The process as set forth in claim 1, wherein the solvent extraction is carried out using a solvent selected from the group consisting of propane, butane, and mixtures thereof.

5. The process as set forth in claim 1, wherein the solvent extraction is carried out using propane.

6. The process as set forth in claim 5, wherein the solvent extraction is carried out using a propane deasphalting process.

7. The process as set forth in claim 5, wherein the solvent extraction is carried out using a volume ratio at 15.6° C. of propane to petroleum vacuum distillation residue ranging from 3:1 to 10:1.

8. The process as set forth in claim 5, wherein the solvent extraction is carried out at a temperature ranging from 50 to 85° C. and under a pressure ranging from 20 to 45 kg./cm.$^2$.

9. The process as set forth in claim 8 wherein the softening point of the intermediate material ranges from 50 to 90° C.

10. The process as set forth in claim 1, wherein the airblowing is carried out until the saturates content is reduced to below 5% by weight.

11. The process as set forth in claim 1, wherein the airblowing is carried out until the saturates content is reduced to below 1% by weight.

12. The process as set forth in claim 1, wherein the airblowing is carried out at a temperature ranging from 200 to 300° C.

13. The process as set forth in claim 12 wherein said airblowing step is carried out for a period of time of from 10 to 18 hours at an air rate of from 0.5 to 2 cubic meters per minute per ton of charge.

14. The process as set forth in claim 13 wherein said airblowing is conducted for a period of time of from 10 to 18 hours at an air rate of from 0.5 to 2 cubic meters per minute per ton of charge.

15. The process as set forth in claim 1, wherein the airblowing is carried out at a temperature ranging from 260 to 280° C.

16. The process as set forth in claim 1, wherein the bituminous material is heated to melting at a temperature of from 200 to 300° C., extrusion spun to form a fiber of from 5 to 20µ in diameter, heated in an oxidizing atmosphere by gradually elevating the temperature from 30 to 80° C. to 200 to 300° C. over a period of from 2 to 10 hours and subsequently carbonized in an inert atmosphere by gradually elevating the temperature up to a temperature of about 1000° C. over a period of from 1 to 6 hours.

17. In a process for producing a carbon fiber comprising:
   (1) removing the low molecular weight fraction from the vacuum distillation residue of petroleum to obtain a material having a mean molecular weight higher than the starting material;
   (2) melting the resulting material at a temperaure of from 200 to 300° C. and extrusion spinning the melted material to obtain a fiber having a diameter of from 5 to 20 microns;
   (3) infusibilizing the resulting fiber by heating said fiber in an oxidizing atmosphere by gradually elevating the temperature from an initial temperature of from 30 to 80° C. to a final temperature of from 200 to 300° C. over a period of from 2 to 10 hours;
   (4) carbonizing the resulting infusibilized fiber to form said carbon fiber by gradually elevating the temperature up to a temperature of from about 1000° C. to 2000° C. over a period of time of from 1 to 6 hours; the improvement comprising:
   removing an oily component rich in low molecular weight aliphatic saturates having a molecular weight of from about 400 to 800 from said vacuum distillation residue of petroleum, said vacuum distillation residue of petroleum comprising said low molecular weight aliphatic saturates, aromatics having a higher molecular weight, resins which are even higher in molecular weight than said aromatics, and asphaltenes having the highest molecular weight which are colloidally dispersed in said saturates, aromatics, and resins, by subjecting said residue to solvent extraction with a lower hydrocarbon extracting solvent capable of extracting said oily component to thereby obtain an intermediate material having a penetration value of from 0 to 10, measured at 25° C., 100 grams and 5 seconds according to ASTM D5, and a saturates content of from 0 to 7 weight percent; and
   airblowing the resulting intermediate material at a temperature of from 200 to 300° C. to convert the intermediate material into a bituminous material having a penetration value determined as set forth above of from 0 to 2, a softening point of from 130 to 200° C., a saturates content of less than 5 weight percent and a carbon content of less than 91% by weight based on the amount of carbon and hydrogen, to thereby obtain a material for said step (2).

18. The process as set forth in claim 17 wherein, after step (3) and before step (4), the fibers are sprayed with an aqueous or alcoholic solution of an inorganic halide containing a surface active agent.

19. The process as set forth in claim 18 wherein said inorganic halide is iron chloride, copper chloride, aluminum chloride or zinc chloride.

20. The process as set forth in claim 1 wherein the penetration values are measured at 25° C., 100 grams and 5 seconds according to the method of ASTM D5.

(References on following page)

References Cited

UNITED STATES PATENTS

| | | | |
|---|---|---|---|
| 3,629,379 | 12/1971 | Otani | 264—DIG. 19 |
| 3,552,922 | 1/1971 | Ishikawa et al. | 264—29 |
| 3,392,216 | 7/1968 | Otani | 264—29 |
| 3,595,946 | 7/1971 | Joo et al. | 264—29 |

FOREIGN PATENTS

| | | | |
|---|---|---|---|
| 21,510 | 9/1968 | Japan | 264—DIG. 19 |
| 2,511 | 2/1969 | Japan | 264—DIG. 19 |
| 1,465,030 | 1/1967 | France | 264—DIG. 19 |

OTHER REFERENCES

S. Otani et al.: "On the Raw Materials of MP Carbon Fiber," Carbon, 1966, vol. 4, Pergamon Press Ltd., at 425–432.

G. A. Purdy: Petroleum, McGraw-Hill Book Co., New York, 1958, at 228–233 and 260–262.

JOHN H. MILLER, Primary Examiner

U.S. Cl. X.R.

264—DIG. 19; 423—447